Nov. 24, 1936.　　　R. CHILTON　　　2,061,896
TRANSMISSION
Filed June 5, 1935　　　3 Sheets-Sheet 1
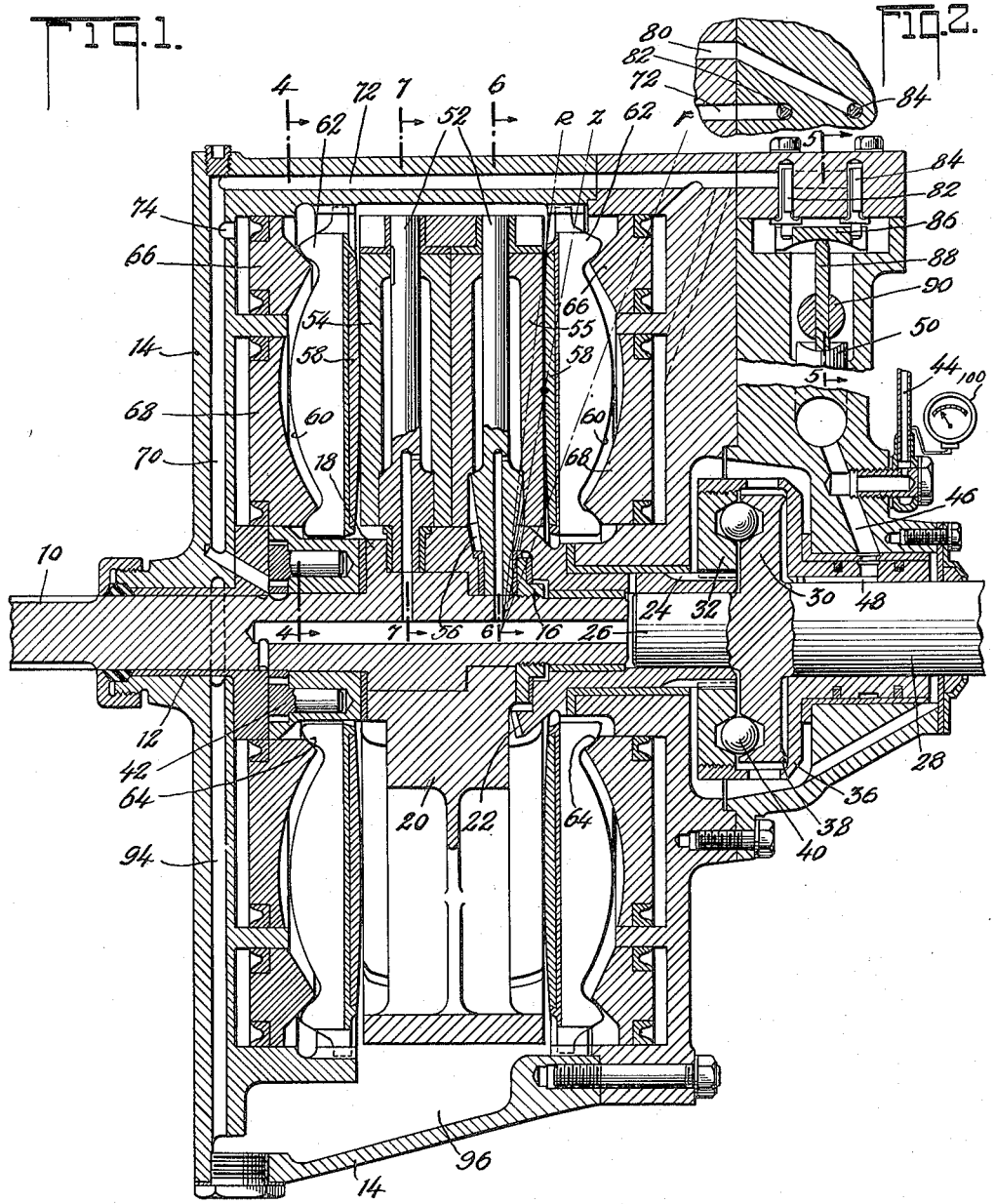
INVENTOR.
ROLAND CHILTON
BY
ATTORNEY.

Nov. 24, 1936.     R. CHILTON     2,061,896
TRANSMISSION
Filed June 5, 1935     3 Sheets-Sheet 2
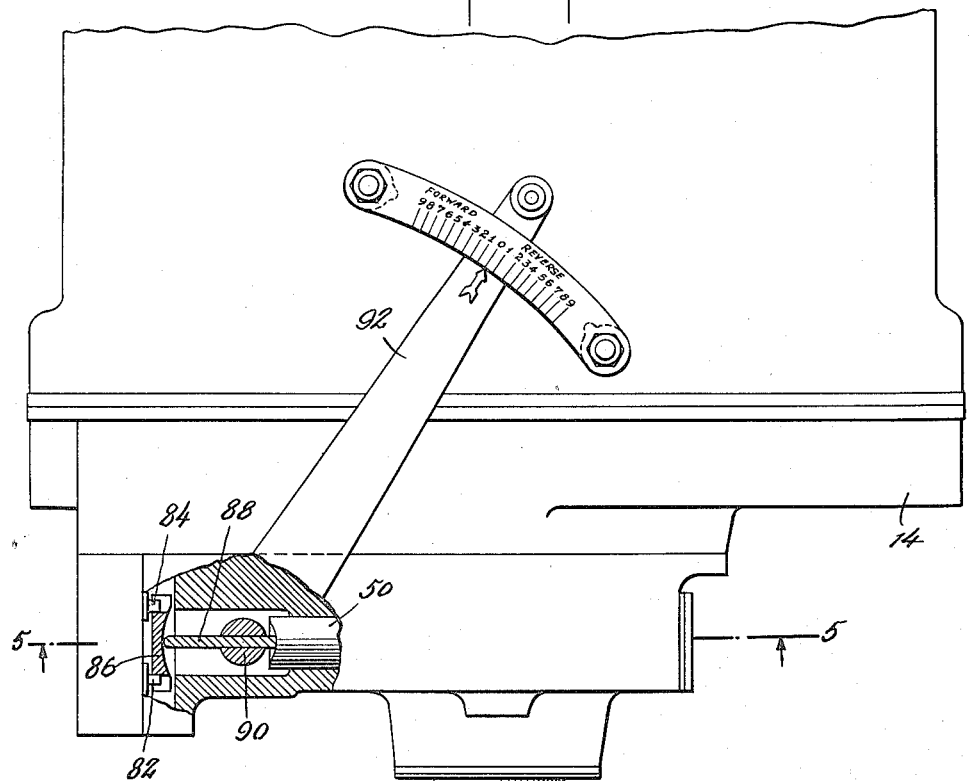
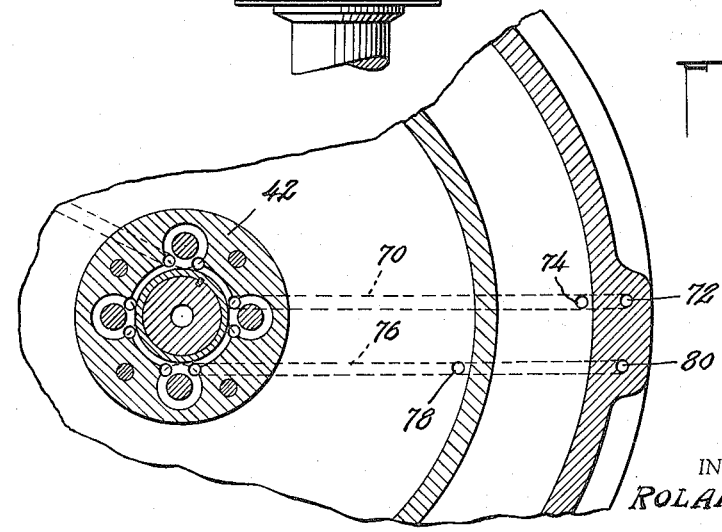
INVENTOR.
ROLAND CHILTON
BY
ATTORNEY.

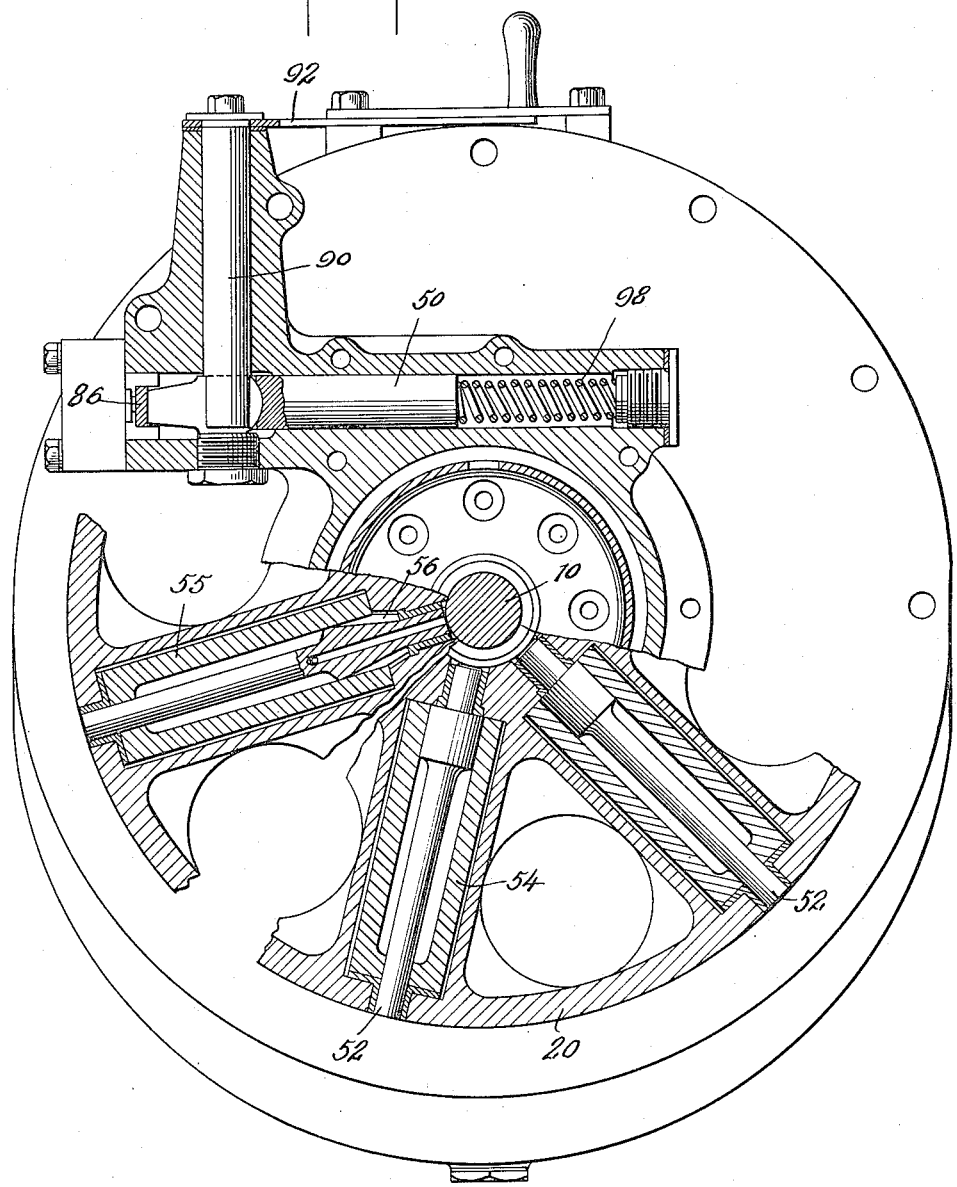

Patented Nov. 24, 1936

2,061,896

UNITED STATES PATENT OFFICE 2,061,896

TRANSMISSION

Roland Chilton, Ridgewood, N. J.

Application June 5, 1935, Serial No. 25,065

20 Claims. (Cl. 74—281)

This invention relates to variable speed transmissions of the general type described in my copending applications, Serial Nos. 669,144, filed May 3, 1933; 728,058, filed May 29, 1934; 742,751, filed September 7, 1934; 742,752, filed September 7, 1934; 743,515, filed September 11, 1934; 746,958, filed October 5, 1934; 759,349, filed December 27, 1934; and 25,066 filed concurrently herewith.

The present invention comprises a transmission intended to be of general utility wherever it is desired to change the speed of a driven shaft from zero to a maximum in both forward and reverse directions using a constant speed source.

Other objects are to provide an improved and simplified means whereby one member may be loaded proportionately to the torque on another member and whereby this may be accomplished without resource to loaded thrust bearings, even though the members have relative rotation. Associated objects are to provide a simplified torque metering coupling organization wherein hydraulic pressure is maintained proportional to the drive load transmitted whereby the torque load on a rotary part may be read on any suitable hydraulic pressure recording means. Another object of the invention is to provide an improved form of control mechanism and one wherein the load relationships at respective ends of a rocker member may be controlled at will while at the same time the gross load on the member is automatically varied in accordance with requirements. In the specific embodiment of the showings, the gross load on a reaction member is maintained in proportion to torque or driving effort on a driven shaft.

In general, the objects and advantages of this invention are in line with those already set forth in my co-pending cases of which the present invention comprises a continuing development.

In the drawings:

Fig. 1 is a longitudinal axial section through a transmission embodying the invention;

Fig. 2 is a fragmentary detail view showing oil passages;

Fig. 3 is a fragmentary plan view;

Fig. 4 is a fragmentary section on the line 4—4 of Fig. 1; and

Fig. 5 is an end view with the upper portion in section on the line 5—5 of Figs. 3 and 1; the left hand portion in section on the line 6—6 of Fig. 1; and the lower portion in section on the line 7—7 of Fig. 1.

Referring first to Fig. 1, a drive shaft 10 is supported in a suitable bearing 12 in a housing 14 and to this shaft is secured, by a nut 16 and drive dogs 18, a cage 20, also shown in transverse section in the lower part of Fig. 5. The shaft 10 and cage 20 comprise the driving member of the transmission and may engage a constant speed power source.

The driven members of the transmission comprise a bevel gear 22 having a splined extension sleeve 24 in which is received a pilot 26 of a driven shaft 28, which is provided with a flange 30. A companion flange 32 engages the splines 24. Screwed to the flange 32 is a valve seat housing 36 cooperating with a lip 38 by which the flange 30 comprises a valve. The flange 30 is driven from the disc 32 by means of balls 40 engaged in inclined pockets in the members as shown. This structure comprises a torque-responsive coupling in the driven shaft 28 whereby the valve 38 is forced against the seat member 36 with a pressure which is always proportional to the driving torque on the shaft.

A quadruple oil pump is indicated in general at 42 and is seen in end view in the fragmentary view of Fig. 4; and one of the pressure pump elements is connected by a suitable pipe, one end of which only is shown at 44, connecting through a hole 46 and groove 48 to the space within the valve lip 38.

The elements just described comprise a master contact load regulating hydraulic system. It will be seen that the large valve elements 36 and 38 comprise a relief valve for the associated pump whereby the hydraulic pressure generated by the pump is automatically controlled to vary in direct proportion with the variations in torque on the driven shaft. Any increase in the driven torque will force the valve closer to its seat, increasing the resistance to escape of the oil delivered by the pump and therefore increasing the pump pressure. Due to the large circumference of the valve seat, only a very small "lift" or opening will be required so that the parts may be adjusted to very slight backlash by means of the screw-threaded connections between the seat member 36 and the driving ring 32. It will be seen that, due to the characteristics of the inclined pockets engaging the balls 40, the device is equally effective under both forward and reverse torques.

The hole 46 communicates with the underside of a master control plunger 50 (see Figs. 1, 3 and 5), which plunger is accordingly always subject to a pressure proportional to the load transmitted.

Mounted in contacting pairs in the cage 20, on spindles 52, are rollers 54—55; the spindles of the latter set of rollers being equipped with bevel pinion 56 meshed with the driven bevel gear 22.

The reaction members of the transmission comprise distortable crown-faced annular discs 58 rockably contacting the respective rollers 54-55 and set into heavy carrier members 60, which are slotted radially to comprise a large number of segments, individually rigid but collectively flexible for distortion with the discs 58. The carrier members 60 have angular annular outer and inner abutments 62—64 engaged by outer and inner annular pistons 66 and 68 disposed in suitable cylinders formed in the housing as shown. The two outer cylinders of the piston 66 are connected together and to one section of the quadruple pump 42, while the cylinders of the inner piston 68 are connected together and to another (and independent) section of the quadruple pump; some of the drilled passages by which these connections are obtained being indicated at 70—72—74 for the outer piston and at 76—78—80 for the inner piston.

The outer piston hydraulic system is also connected to a small relief valve 82, while the inner piston system is connected to a companion valve 84, both seen in the upper right hand portion of sheet 1, Fig. 2, and again in Fig. 3.

The relief valves 82—84 are bridged by a floating control beam 86 for which a blade 88 comprises a movable fulcrum. This blade passes through a slot in a control shaft 90 secured to a control lever 92 and the blade 88 abuts a spherical depression formed at the top of the master control piston 50.

The fourth section of the quadruple pump is used for lubrication purposes and the inlets of all four sections are connected together and to a passage 94 to draw oil from a sump 96.

It will now be seen that (neglecting the lubrication system), I have three hydraulic systems served by three independent pump sections, as follows:

(a) The master hydraulic system effective on the master control plunger 50 and pressure-regulated by the torque-responsive load coupling so that the pressure on this plunger is always in proportion to the torque on the drive shaft 28;

(b) The outer hydraulic system serving the outer annular control pistons 66 and having the relief valve 82, and (c) The inner hydraulic system serving the inner annular control pistons 68 and having the relief valve 84.

It should now be evident that the relationship of the pressures in the last two systems is determined by the position of the control blade 88 along the floating control beam 86. When the control blade 88, which forms a moving fulcrum for this beam, is in the middle position shown, the pressures on the inner and outer control pistons must be equal. However, the amount of these pressures is determined by the torque responsively loaded master control 50, whereby the sum of the pressures on the two pistons together is always proportional to the torque transmitted and varies instantaneously therewith.

The rocked positions of the distortable reaction discs 58 with their carrier members 60 obviously depends on the relative pressures of the outer and inner pistons 66 and 68. If these pistons have equal area, then the reaction disc will be in the middle position shown when the hydraulic pressures are equal, i. e., when the control blade 88 is in the mid-position shown, then, as the control blade is moved, say towards the valve 82 of the outer piston, the pressure on this piston will increase while the pressure on the inner piston will decrease bringing the outer peripheries of the discs closer together and rocking the contact points of the discs on the rollers outwardly.

The angular line "Z" in Fig. 1, represents the pitch cone angle of the driven bevel gear 22 and this line intersects the surface of the rollers at their mid-length. The disc contact on the roller 10 is shown at the radius of this intersection whereat the pitch cone angle subtended by the contacts is identical with the pitch cone of the bevel gear and, under this condition the driven bevel gear 22 and the disc 58 must have the same state of rotation, regardless of the speed of the rollers and planet cage 20. Since the discs are stationary it follows that the driven bevel gear will also be held to zero rotation under this condition. Rocking motion of the discs to move the contacts outwardly will start the driven shaft in motion and progressively increase the driving ratio in reverse. Similarly, by rocking the discs so as to move the contact points inwardly, progressively increasing forward ratios are provided.

It is a principle in transmissions, in general, that the torque reaction on the housing or reaction member in forward ratios, is the difference between the input and output torques while in reverse driving ratios, the reaction is the sum of the input and output torques. In consonance with this principle, this transmission is arranged for the reverse contacts to occur at the greater radii from the axis and a very important result may then be achieved by the use of suitable proportions, such as those shown, as follows:

The contact shift subtends the range of pitch cone angles indicated by the lines "R", "Z" and "F", representing maximum speed reverse, zero speed and maximum speed forward, respectively. With the range indicated, the transmission will have maximum forward and reverse speeds of the driven shaft of one-half the speed of the driving shaft. Referring to torque relationships, this means that if we call the torque on the driven shaft 1, then in extreme forward and reverse ratios, the torque in the driving shaft will be one-half. Then in forward speed the reaction on the discs 58 will be $1-\frac{1}{2}=\frac{1}{2}$, and in reverse will be $1+\frac{1}{2}=1\frac{1}{2}$.

In other words, in maximum reverse ratio, the torque reaction transmitted by the driven disc contacts is three times the torque reaction to be transmitted in highest forward speed. The important provision referred to resides in the fact that the ratio in the contact radii for these two conditions is also three to one; the higher radius corresponding to the higher reaction torque, so that the torque-responsive master load system produces the appropriate load to prevent slipping under all conditions and in spite of the fact that the radius of contact varies over a large range.

In many of the transmissions of the prior art, which include a variable radius contact member, these relationships have not been respected with the result that, if adequate contact pressure, as from a torque-responsive means, is imposed when the driving radius is minimum, then there is excessive contact load over the requirements when the contact radius is shifted to maximum. These excessively high contact loads have been a source of unnecessary friction losses, which are avoided with the disposition of this invention, whereby the contact loads are automatically maintained in proportion to the instantaneous requirements, in spite of changes in the power transmitted; in ratio, and in contact radius.

Beneath the master control plunger 50 in Fig. 5 will be seen a light spring 98 which may be used to "pre-load" the transmission by applying initial pressure to the master control piston 50 and thus to the relief valves 82—86 to which initial load the torque responsively regulated hydraulic pressure on the master control plunger is added as the torque transmitted increases.

A conventional pressure recording gauge 100 may be connected (see Fig. 1) into one of the hydraulic systems described, thereby affording an index of the loads on the associated parts. The torque-responsive pressure regulating coupling 30—32—36—40 then comprises a torque-meter whereby the load on the associated shaft may be measured at any instant by means of a conventional pressure gauge, and the provision of such a simplified torque-meter is one of the objects of this invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a first transmission member, of a contact load piston therefor, a pump hydraulically connected therewith, a second transmission member drivably related with the first said transmission member and having parts organized for slight rotational backlash, and a hydraulic pressure relief valve for said pump organized to resist said backlash.

2. In a transmission, in combination, a shaft subject to varying driving torque, a torque-responsive means associated with said shaft, a pressure relief valve loaded by said means, hydraulic pressure means regulated by said valve, whereby the pressure varies in proportion with the torque, and members drivably related with said shaft and contact loaded by said pressure.

3. The combination with a rolling contact transmission member, of a drive shaft, a torque-responsive means thereon, a pressure relief valve loaded by said means, a pump pressure regulated by said valve, and a piston subject to said pressure, and effective to contact load said member.

4. The combination with a transmission member having inner and outer margins and rockable by opposite movement thereof, of hydraulic systems effective at respective margins and each comprising a piston, a pump, and a pressure relief valve; a balance beam connecting said valves, a movable fulcrum means for said beam, and means to load said fulcrum proportionally to the load transmitted.

5. The combination with a transmission shaft subject to varying torque, of a relief valve, torque-responsive loading means for said valve, a pump connected with and pressure controlled by said valve, control means including a pressure proportioning beam having a movable fulcrum loaded by said pressure, a second pump, and a pressure relief valve therefor engaging said beam whereby the last said pressure is increased automatically with said torque and is subject to variation by movement of said fulcrum.

6. In a transmission, in combination, a torque-transmitting shaft, pistons, a rocker member connecting said pistons, pumps and relief valves cooperating with respective pistons, a floating lever restraining said valves, a movable fulcrum restraining said lever, and a master rocker load control system including a master piston loading said fulcrum, a master pressure pump, a master relief valve, and torque-responsive means to load said valve.

7. A variable torque transmission including, in combination, pistons, a member to be rocked connecting said pistons, pumps and relief valves cooperating with respective pistons, rocking control means including a balance beam connecting said valves and a movable fulcrum therefor; and a master load control system including a master pump, a master relief valve, a master piston loading said fulcrum, and means to load said master relief valve proportionally to the torque transmitted.

8. The combination with a transmission shaft including torque-responsive means, of a transmission rocker member to be loaded, pistons connected by said rocker, pumps and pressure relief valves serving respective pistons, a balance beam connecting said valves, a movable fulcrum for said beam; and a master load-control system including a master pressure pump, a master piston loading said fulcrum, and a relief valve loaded by said torque-responsive means.

9. The combination with a torque-transmitting shaft, of a torque-responsive means thereon, a loading control means including a piston, a pump, a relief valve loaded by said torque-responsive means, and transmission means drivably connected with said shaft and operated by said piston from fluid pressure regulated by said valve.

10. The combination with torque-transmitting shaft members, of coupling means therebetween urging said members to separation, a pump, hydraulic pressure control means for said pump resisting said separation, and transmission means in driving relation with said shaft member and operated by pressure regulated by said control means.

11. The combination with torque-transmitting shaft members, of a coupling imposing torque-responsive load therebetween, a hydraulic pressure pump, pressure control means organized to balance said load, and transmission members drivably connected with said shaft members and operated by the controlled hydraulic pressure.

12. The combination with torque-transmitting shaft members, of torque-responsive load producing means, a pump, a pump pressure control means regulated by said load, and means drivably associated with one said shaft member and operated by pressure from said pump.

13. The combination with a first shaft including a by-pass valve member, of a second shaft including a valve seat member, coupling means between said shafts torque-responsively forcing the valve toward the seat, a pump pressure-regulated by said valve, and means drivably associated with said second shaft and operated by pressure from said pump.

14. In a transmission, a first transmission member, hydraulic contact loading means therefor, a second transmission member, a torque-responsive hydraulic pressure control means thereon, and a pump means, all said means being hydraulically connected together.

15. The combination with a transmission member to be rocked and contact loaded, of two hydraulic systems including pistons connected by said member, control means operable at will to vary the relative hydraulic pressures in said systems, a torque-responsive drive shaft coupling, and a third hydraulic system pressure regulated by said coupling and organized to load said control to determine the gross contact load.

16. The combination with a torque-transmitting shaft and a transmission member to be contact loaded and rocked, of two hydraulic systems including pistons connected by said member, means operable at will to control the relative hydraulic pressures on said pistons to effect said rocking, and torque-responsive means to independently regulate the aggregate piston load.

17. In a transmission in combination, a torque-transmitting shaft, a member drivably connected thereto to be contact loaded and rocked, hydraulic pistons connected by said member, and means to independently control the relative and the aggregate hydraulic pressures on said pistons.

18. The combination with two hydraulic pistons, of a transmissionu member to be rocked for ratio change and contact loaded thereby, and means to control the aggregate and the relative hydraulic piston pressures respectively, the first said means comprising an automatic contact load control, and the second said means comprising a selective ratio control.

19. The combination with a transmission member, of a drive shaft, a torque-responsive means thereon, a pressure relief valve loaded by said means, a pump pressure regulated by said valve, and an hydraulic gauge subject to said pressure, whereby the gauge reading is proportional to the torque to which the shaft may be subject.

20. In a transmission, in combination, torque-transmitting means adapted to generate a thrust proportional to the torque transmitted, a hydraulic relief valve loaded by said thrust, a hydraulic pump pressure regulated by said valve, and a gauge adapted for reading the pressures so regulated and accordingly to indicate the value of the torque transmitted.

ROLAND CHILTON.